(12) United States Patent
Choi (10) Patent No.: US 7,757,823 B2
(45) Date of Patent: Jul. 20, 2010

(54) ELECTRIC PARKING BRAKE

(75) Inventor: Jin Young Choi, Suwon-si (KR)

(73) Assignee: Mando Corporation, Gyeonggi-Do (KR)

( * ) Notice: Subject to any disclaimer, the term of this patent is extended or adjusted under 35 U.S.C. 154(b) by 928 days.

(21) Appl. No.: 11/523,861

(22) Filed: Sep. 19, 2006

(65) Prior Publication Data

US 2007/0125605 A1 Jun. 7, 2007

(30) Foreign Application Priority Data

Dec. 7, 2005 (KR) .................... 10-2005-0118466

(51) Int. Cl.
*F16D 55/08* (2006.01)
(52) U.S. Cl. .................... 188/72.7; 188/72.8; 188/158; 188/171
(58) Field of Classification Search ............... 188/72.7, 188/72.6, 72.8, 71.9, 106 P, 158, 162, 171
See application file for complete search history.

(56) References Cited

U.S. PATENT DOCUMENTS 5,257,673 A * 11/1993 Sato et al. .................. 180/271
6,390,247 B1 * 5/2002 Drennen .................... 188/72.8

FOREIGN PATENT DOCUMENTS

| EP | 1767419 A | 3/2007 |
|----|-----------|--------|
| JP | 2004-142522 | 5/2004 |
| JP | 2004-161101 | 6/2004 |
| JP | 2005-205975 | 8/2005 |
| JP | 2006/044632 A | 2/2006 |
| JP | 2006/046631 A | 2/2006 |
| JP | 2006/046638 A | 2/2006 |
| KR | 10-1996-017386 | 6/1996 |
| KR | 20-0284896 | 8/2002 |
| KR | 10-2004-0039153 | 5/2004 |
| WO | WO-2006/003983 A1 * | 1/2006 |

* cited by examiner

*Primary Examiner*—Pam Rodriguez
(74) *Attorney, Agent, or Firm*—McDermott Will & Emery LLP (57) ABSTRACT

An electric parking brake including a housing, an actuator, a gear box assembly, a driven gear, a spindle, a screw nut, an equalizer through which the spindle is penetrated and the screw nut is rotatably inserted, brake cables connected to opposite sides of the equalizer, respectively, each brake cable having a first end formed with a coupling piece for the connection of the equalizer and a second end connected to an associated one of wheel brake devices, and an emergency release device including cam units and operating levers and adapted to slacken the brake cables in an emergency release situation, so as to release the parking brake. In the case of any emergency situation, such as electric discharge of a vehicle or failure of the parking brake, the parking brake is released by a simple cable pulling action. Further, the parking brake has the effect of preventing a vehicle driver from being placed in any dangerous situation, because there is no need for the vehicle driver to get underneath the vehicle, and improving the convenience of operation because it can be released from any place where a cable is connected, such as a driver's seat, etc.

4 Claims, 6 Drawing Sheets

Fig. 1

Prior Art

ELECTRIC PARKING BRAKE

CROSS-REFERENCE TO RELATED APPLICATION

This application claims the benefit of Korean Patent Application No. 2005-0118466, filed on Dec. 7, 2005 in the Korean Intellectual Property Office, the disclosure of which is incorporated herein by reference.

BACKGROUND OF THE INVENTION

1. Field of the Invention

The present invention relates to an electric brake, and, more particularly, to an electric brake having an emergency release device, which can achieve a simplified release operation of a parking brake in an emergency situation, such as a failure or traction of the parking brake.

2. Description of the Related Art

Generally, vehicles are equipped with a variety of actuating systems or control systems for attempting to achieve their efficient operation. One of the systems is a parking brake device to keep a vehicle in a parked state or stationary state for a long time.

Figure 1:
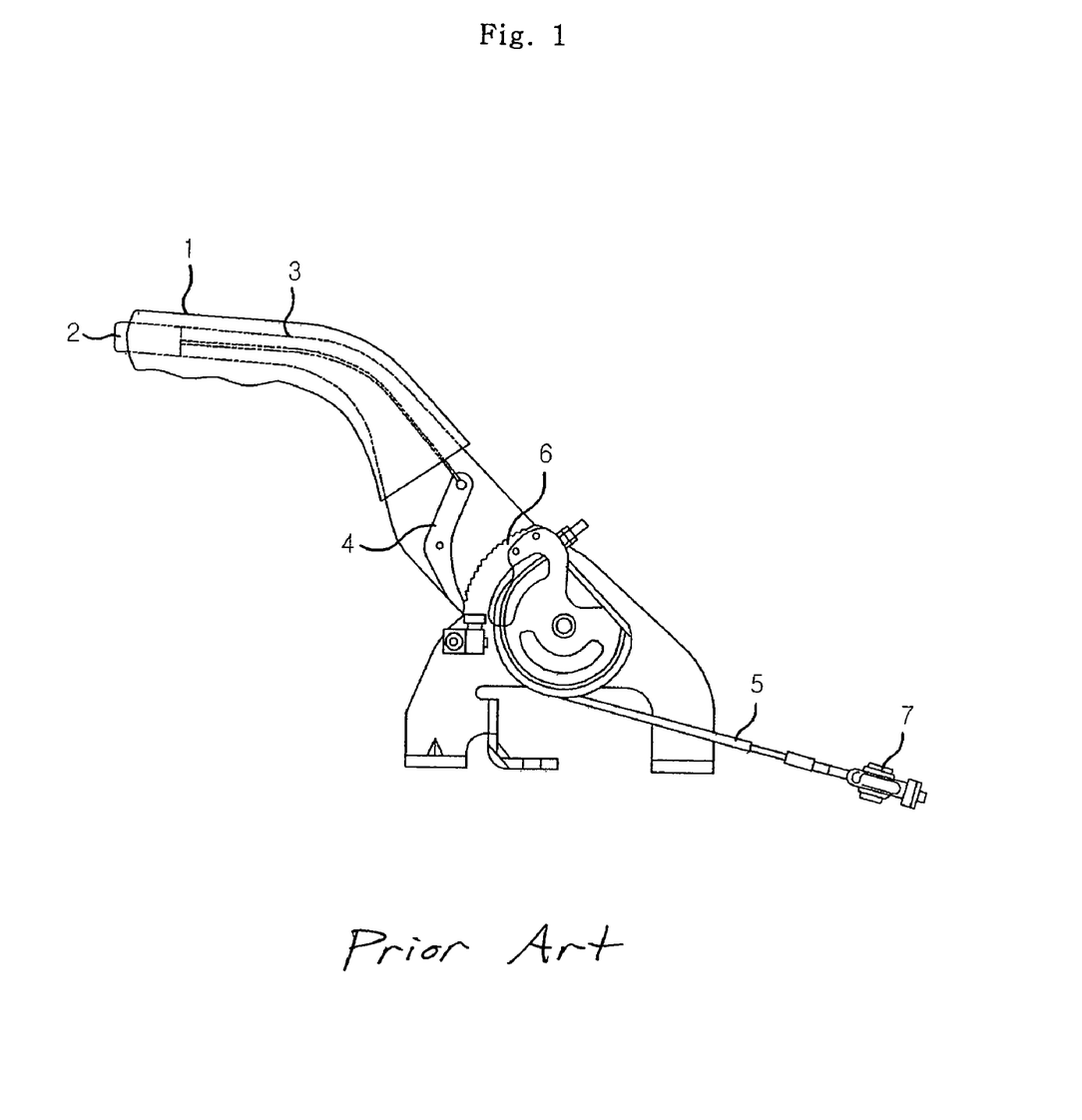
FIG. 1 is a schematic sectional view showing a conventional parking brake device.

A most widely used example of the parking brake device is a cable parking brake device as shown in FIG. 1. The cable parking brake comprises a hinged grip 1 to be moved up and down manually while being gripped by a hand, a moving rod 3 disposed in the grip 1 to be connected, at one end thereof, to a button 2, a hinged pole 4 having one end connected to the other end of the moving rod 3, a cable 5 having one end connected to a wheel brake assembly while being secured by the pole 4, and a latch assembly 6 winding the cable 5 therearound to keep the cable 5 in a pulled state when the grip 1 is moved upward.

With the above described configuration, if a vehicle driver moves the grip 1 upward by his/her hand, the latch assembly 6 pulls the cable 5, so as to actuate the wheel brake assembly. Then, if the upward movement of the grip 1 stops, the other end of the pole 4 is engaged with the latch assembly 6 to keep the cable 5 in a pulled state. Thereby, the vehicle is kept in a stationary state.

Conversely, to release the parking brake, if the vehicle driver moves the grip 1 downward while pressing the button 2, the button 2 is displaced to move the moving rod 3 downward, thereby causing the pole 4 connected to the other end of the moving rod 3 to move downward. Thereby, the cable 5 is slackened, resulting in a release of the wheel brake assembly.

Meanwhile, the brake cable 5 is connected to an equalizer 7. This allows the same braking force to be applied to both rear wheels of the vehicle, so as to maintain a stable braking operation of the vehicle.

However, the above described conventional parking brake has an inconvenience in operation because it has to be operated manually. Accordingly, to improve the convenience of vehicle drivers, electric brakes using an electric motor have been provided recently. Examples of the electric brakes are disclosed in several documents, for example, Korean Patent Applications Nos. 10-1995-0039669 and 10-2002-0070530 and Korean Utility Model Application No. 20-2002-0015389, etc.

However, although the conventional electric parking brakes have the effect of improving the convenience of vehicle drivers, they have the risk of causing very dangerous situation and suffer from a complicated parking brake release operation because a vehicle driver or repairman should get underneath a vehicle to release the parking brake in an emergency situation, such as a failure or traction of the parking brake.

SUMMARY OF THE INVENTION

The present invention has been made in order to solve the above problems. It is an aspect of the invention to provide an electric parking brake having an emergency release device, which can achieve a simplified easy release operation of the parking brake upon a failure or traction of the parking brake.

Consistent with one aspect, an exemplary embodiment of the present invention provides an electric parking brake comprising: a housing defining an outer appearance of the parking brake; an actuator mounted at one side of the housing to perform forward and reverse rotations; a gear box assembly having gears to reduce a rotating force generated from the actuator; a driven gear provided in the gear box assembly to transmit the reduced rotating force; a spindle having screw threads engaged with the driven gear; a screw nut having a coupling hole to be screwed to the spindle; an equalizer through which the spindle is penetrated and the screw nut is rotatably inserted; brake cables connected to opposite sides of the equalizer, respectively, each brake cable having a first end formed with a coupling piece for the connection of the equalizer and a second end connected to an associated one of wheel brake devices; and an emergency release device comprising at least one cam unit and at least one operating lever, the emergency release device being adapted to slacken the brake cables in an emergency release situation, so as to release the parking brake.

The brake may further comprise: a force sensor provided at one side of the gear box assembly to allow the spindle to be penetrated therethrough, the force sensor being used to measure a force to be applied to the electric parking brake, and the force sensor may comprise: a casing defining an outer appearance thereof; an elastic member wound on the spindle, to which a rotating force of the spindle is transmitted; and a plate member to convert the rotating force transmitted to the elastic member into a linear displacement of the elastic member.

The emergency release device may further comprise protrusions integrally extended from the casing of the force sensor, the at least one cam unit may comprise a plurality of cam units adapted to be normally caught by the protrusions, respectively, so as to support the force sensor at a fixed position and to be rotated in an emergency release situation so as to be released from the protrusions, and the at least one operating lever may comprise a plurality of operating levers, each operating lever having one end coupled to an associated one of the cam units by use of a shaft fitted in a hole of the associated cam unit and adapted to rotate the associated cam unit in an emergency release situation.

Each operating lever may have an operating slot formed at the other end thereof not connected to the associated cam unit, and an operating shaft may be fitted in the operating slot to allow the operating levers of a pair to be moved in the same direction as each other even if one of the operating levers is moved.

A cable may be connected to the operating slot of each operating lever, to allow the electric parking brake to be released manually if the cable is pulled.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the exemplary embodiments of the invention will become apparent and more readily appreciated from the following description of the embodiments, taken in conjunction with the accompanying drawings, of which.

DETAILED DESCRIPTION OF THE PREFERRED EMBODIMENTS

Reference will now be made in detail to exemplary embodiments of the present invention, examples of which are illustrated in the accompanying drawings, wherein like reference numerals refer to like elements throughout. The embodiments are described below to explain the present invention by referring to the figures.

Figure 2:
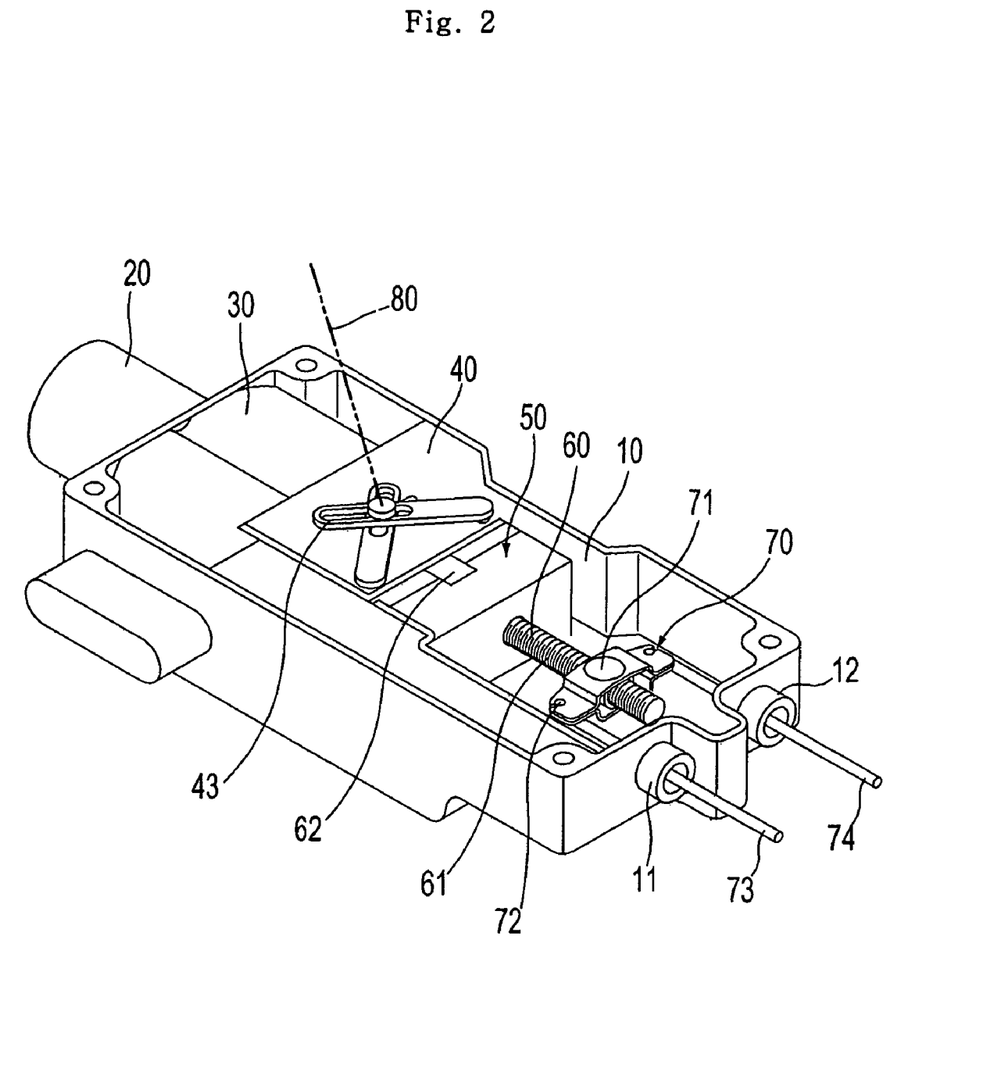
FIG. 2 is a perspective view showing the inner configuration of an electric parking brake consistent with an embodiment of the present invention.

FIG. 2 is a perspective view showing the inner configuration of an electric parking brake consistent with an embodiment of the present invention.

As shown in FIG. 2, a housing 10 has a rectangular box shape and is mounted to a vehicle body or frame. Two through-holes 11 and 12 are perforated through a front wall of the housing 10 for the passage of brake cables 73 and 74.

An actuator 20 is mounted to a rear wall of the housing 10 and adapted to generate power required to actuate the brake. In the embodiment of the present invention, the actuator 20 of the electric parking brake is mounted at the outside of the housing 10. Preferably, the actuator 20 may be a step motor rotatable forward and reverse. The actuator 20 is connected to a controller (not shown) that is operated by a vehicle driver.

A gear box assembly 30 is disposed in the housing 10 such that the power generated from the actuator 20 is transmitted thereto. The gear box assembly 30 serves to reduce a speed caused by the power generated from the actuator 20. Such a reduction in speed is achieved as a plurality of gears received in the gear box assembly 30 are engaged with one another. An emergency release device 40 is provided below the gear box assembly 30 to release the parking brake in an emergency situation. The emergency release device 40 is externally provided with plurality of operating levers 43, and a cable is connected to the levers 43 to release the electric parking brake in an emergency situation.

A box-shaped force sensor 50 is mounted to a lower end of the emergency release device 40 and adapted to measure the intensity of a force acting to the parking brake. It is noted that it is not essential for the parking brake consistent with the embodiment of the present invention have the force sensor 50. The parking brake consistent with the embodiment of the present invention is electrically operable differently from a conventional handle parking brake, and thus, is adapted to brake a vehicle via a simple button press operation by regulating a force to be applied to the parking brake based on a road surface state or slope. Accordingly, the force sensor 50 is used to detect the force to be applied to the parking brake.

The cable of the emergency release device 40 to be pulled to release the parking brake can be installed at any place preferred by users, such as a driver's seat, trunk, etc. Also, the emergency release device 40 is designed as a cable puller type having a mechanism of the operating levers, cams, etc. to assist the pulling of the cable.

A spindle 60 has a rod shape having a predetermined length, and is continuously formed with screw threads 61 in a longitudinal direction thereof. To guarantee the spindle 60 to be stably operated without the risk of unintentional separation from the emergency release device 40, the spindle 60 is formed with a fixing portion 62 at an end thereof facing the emergency release device 40.

A screw nut 71 is screwed around the spindle 60. Specifically, the spindle 60 is inserted through the screw nut 71 having a coupling hole (not shown) formed with screw threads to be fastened with the screw threads 61 of the spindle 60. With this fastening structure, if the spindle 60 rotates, the screw nut 71 is moved forward or rearward in accordance with a rotating direction of the spindle 60 by interaction between the screw threads 61 and the coupling hole of the screw nut 71. This is possible by forward and reverse rotations of the actuator 20.

The brake cables 73 and 74 are connected to an equalizer 70. Each of the brake cables 73 and 74 has a cylindrical coupling piece (not shown) integrally formed at one end thereof. The coupling piece (not shown) is coupled into an associated one of insertion holes 72 formed at opposite sides of the equalizer 70. Thereby, if the equalizer 70 is pulled, the brake cables 73 and 74 connected to the equalizer 70 are pulled, thereby allowing a parking brake device provided at each vehicle wheel to be operated to keep the wheel in a braked state. In this way, the vehicle can be kept in a parked state.

Figure 3:
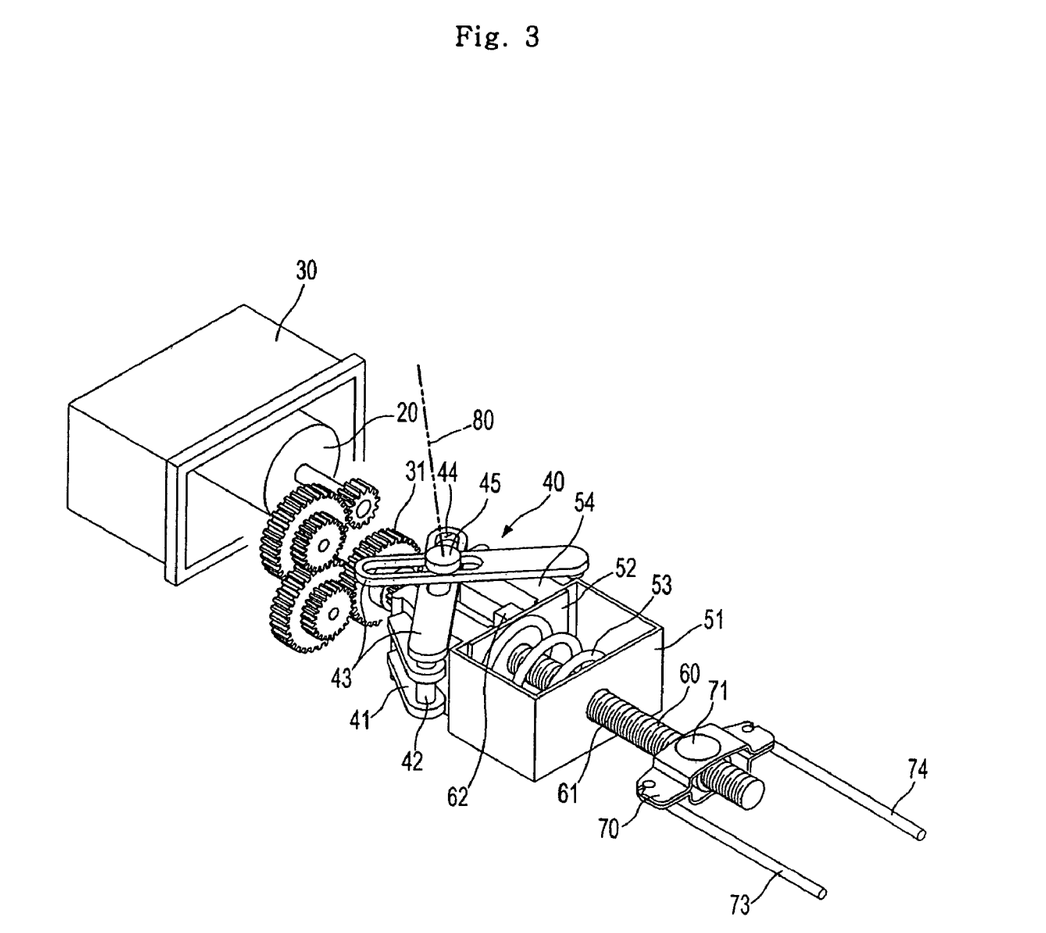
FIG. 3 is an exploded perspective view showing the inner configuration coupling relationship of a gear box assembly, force sensor, and an emergency release device of the electric parking brake consistent with the embodiment of the present invention.

FIG. 3 is an exploded perspective view showing the inner configuration and coupling relationship of the gear box assembly, force sensor, and emergency release device of the electric parking brake consistent with the embodiment of the present invention.

As stated above, the plurality of gears disposed in the gear box assembly 30 are adapted to reduce a rotating force transmitted from the actuator 20 that is mounted at the outside of the housing 10 (See FIG. 1). Of the plurality of gears in the gear box assembly 30, in particular, a driven gear 31 is cooperatively installed to transmit the rotating force from the actuator 20 to an external device. The driven gear 31 is coupled to the spindle 60 by use of a rotating shaft thereof.

The force sensor 50 is located below the driven gear 31 such that the spindle 60 penetrates through the force sensor 50. The force sensor 50 includes a box-shaped casing 51, a plate member 52 located in the casing 51, and an elastic member 53 surrounding an outer circumference of the spindle 60 located in the casing 51. The fixing portion 62 is formed at a wall of the casing 51 facing the gear box assembly 30, to prevent unintentional separation of the spindle 60 during rotation of the spindle 60.

The force sensor 50 further includes protrusions 54 extended from the wall of the casing 51 facing the gear box assembly 30. The protrusions 54 are used to install the emergency release device 40 of the electric parking brake consistent with the embodiment of the present invention. Cam units 41 each including a plurality of cams are provided at opposite outer sides of the respective protrusions 54 such that they are caught by the protrusions 54 to support and keep the casing 51 at a predetermined position. A rotating shaft 42 is inserted through one end of each cam unit 41 to rotatably support the cam unit 41. The other end of each cam unit 41 is caught by an associated one of the protrusions 54. In the present embodiment, two pairs of four cams are provided at left and right sides of the casing 51 to be caught by the protrusions 54 extended from opposite locations of an upper surface of the casing 51, but the number of the cams is not limited to the embodiment.

The rotating shaft 42 of each cam unit 41 has one end coupled to one end of an associated one of the operating levers 43. The other end of the operating lever 43 is perforated with a longitudinally elongated operating slot 44. In the present embodiment, two operating levers 43 are provided such that one of the levers 43 is coupled to the rotating shaft 42 penetrating through the two left-side cams and the other lever 43 is coupled to the rotating shaft 42 penetrating through the two right-side cams. The two operating levers 43 cross each other at their operating slots 44, and an operating shaft 45 is penetrated through the operating slots 44.

Figure 4:
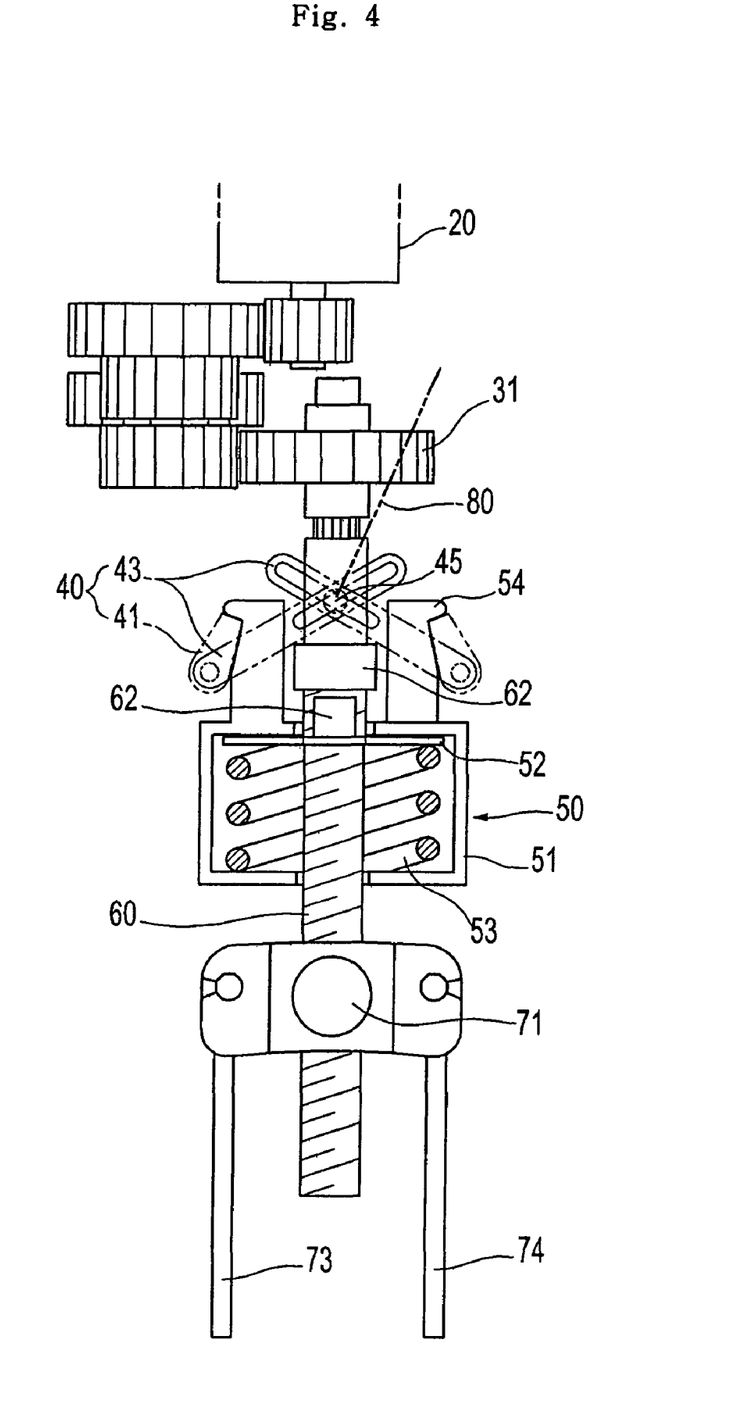
FIG. 4 is a sectional view of the electric parking brake consistent with the embodiment of the present invention, showing a state prior to being operated.

Now, the operation of the electric parking brake consistent with the embodiment of the present invention will be explained with reference to FIGS. 4 to 6. FIG. 4 is a sectional view of the electric parking brake consistent with the embodiment of the present invention, showing a state prior to being operated.

When the parking brake is not in use, for example, during traveling of a vehicle, the actuator 20 is not operated. Accordingly, the spindle 60 is not rotated and thus, the force sensor 50 is also not operated. In this case, the cam units 41 of the emergency release device 40 are strongly coupled to the protrusions 54 of the force sensor 50.

Figure 5:
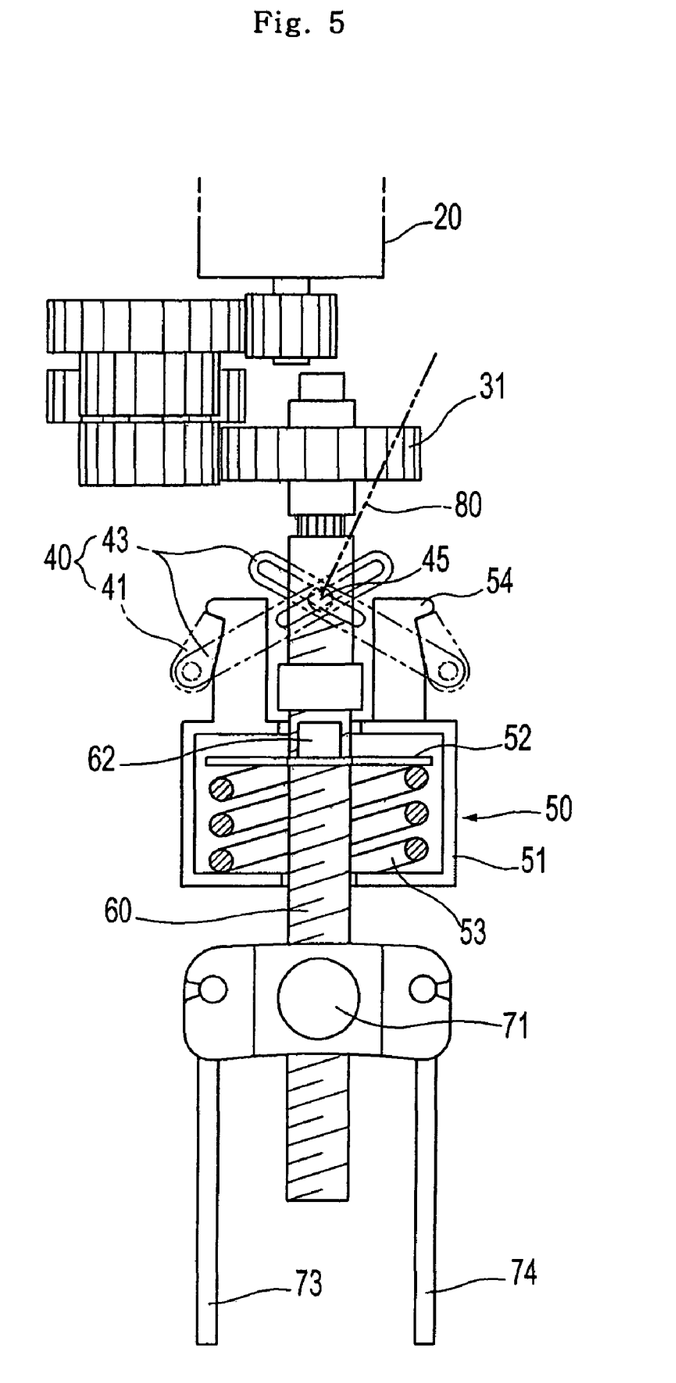
FIG. 5 is a sectional view showing an operating state of the electric parking brake consistent with the embodiment of the present invention.

FIG. 5 is a sectional view showing an operating state of the electric parking brake consistent with the embodiment of the present invention.

If the vehicle driver presses a button of the electric parking brake, the actuator 20 is rotated by the controller (not shown). As the actuator 20 rotates, the gears in the gear box assembly 30 are rotated, thus causing rotation of the driven gear 31. If the driven gear 31 is rotated, the spindle 60 connected to the rotating shaft of the driven gear 31 is rotated, and the plate member 52 in the force sensor 50 is moved inward of the casing 51. Thereby, the elastic member 53 is compressed by the inwardly moved plate member 52, and the force sensor 50 acts to measure a displacement of the elastic member 53. The equalizer 70 is moved toward the force sensor 50 by rotation of the spindle 60. Thereby, the brake cables 73 and 74 are pulled, keeping a vehicle in a parked state. If the button is again pressed to release the brake, the above described operation is performed reversely, to release the parked state of the vehicle.

Figure 6:
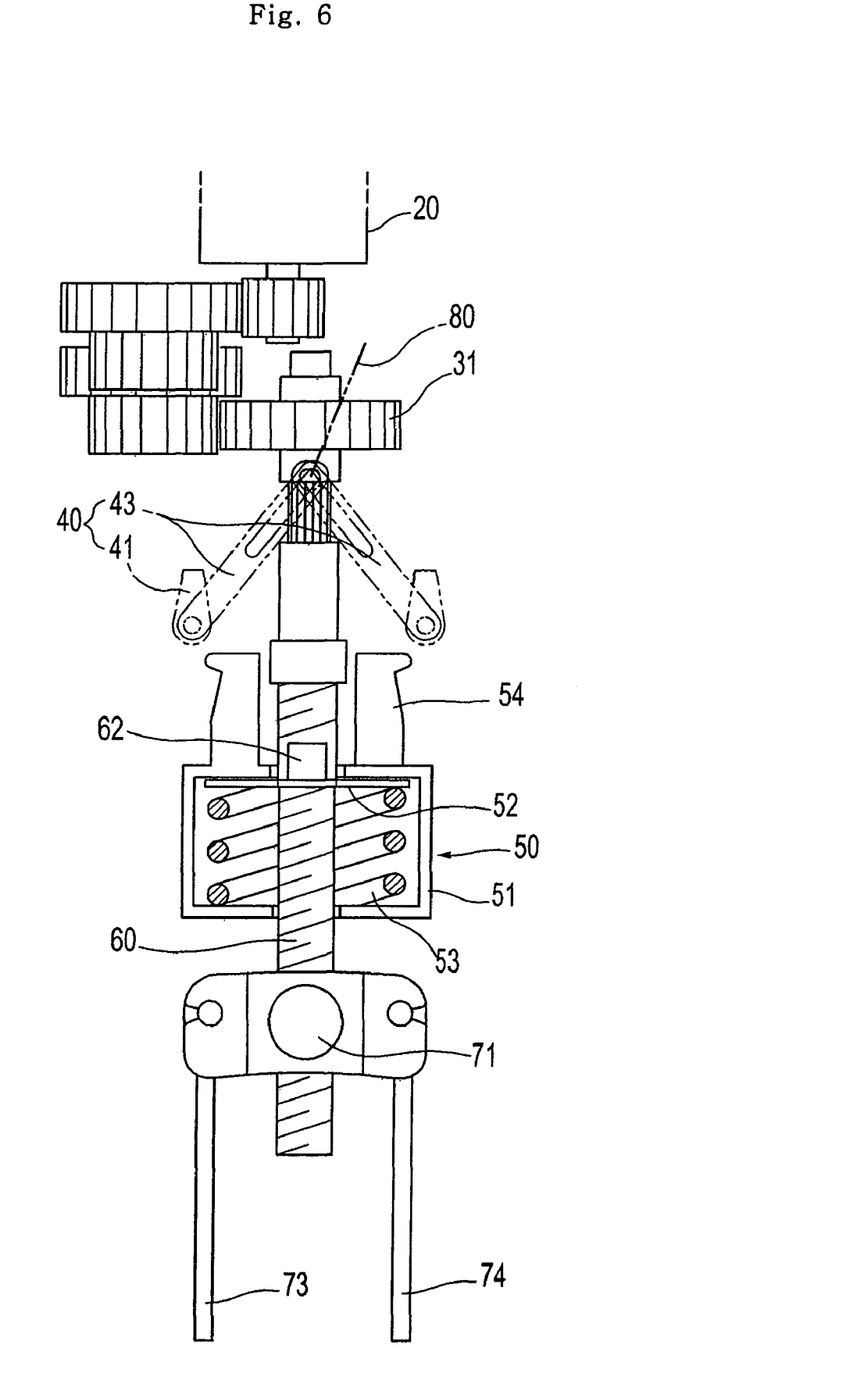
FIG. 6 is a sectional view showing the emergency release device of the electric parking brake consistent with the embodiment of the present invention, which is in an emergency released state.

FIG. 6 is a sectional view showing the emergency release device of the electric parking brake consistent with the embodiment of the present invention, which is in an emergency released state. The electric parking brake is adapted to perform a vehicle parking by a simple button press operation, thereby achieving an improvement in the convenience of a vehicle driver. However, in the case of any emergency situation, such as electric discharge of the vehicle or failure of the parking brake, etc., it is impossible to release the parked state of the vehicle brake in the driver's seat, etc. Accordingly, the vehicle driver has to get underneath the vehicle, and this is very dangerous and troublesome work.

To solve the above described problem, in the present invention, a cable 80 is connected to the operating levers 43 of the emergency release device 40. Thereby, by connecting the cable 80 to any place preferred by users, such as a driver's seat, trunk, or the like, an operation for releasing the parking brake can be performed conveniently.

The cable 80 is connected to one end of the respective operating slots 44 of the operating levers 43. If one of the operating levers 43 is pulled by the vehicle driver, the two operating levers 43 connected to each other by the operating shaft 45 are simultaneously moved forward. If the operating levers 43 are moved, the rotating shafts 42 connected to the ends of the respective operating levers 43 are rotated, thereby causing the cam units 41 coupled to the rotating shafts 42 to be rotated. The cam units 41 are originally tilted by a predetermined angle, but are vertically oriented by rotation thereof. Thus, the cam units 41, which support the protrusions 54 formed at an upper end of the force sensor 50, are released from the protrusions 54, thereby allowing the force sensor 50 to be pushed rearward. If the force sensor 50 is pushed rearward, the equalizer 70 is moved rearward by rotation of the spindle 60, thereby allowing the brake cables 73 and 74, which are in a pulled state, to be slackened, and the parking brake to be released.

As apparent from the above description, the present invention provides an electric parking brake, which has the effect of not only simplifying a vehicle parking operation, but also achieving a parking brake release operation with a simple cable pulling action in an emergency situation, such as a failure of the parking brake or electric discharge of a vehicle.

Thereby, the present invention has no need for a vehicle driver to get underneath a vehicle to operate an emergency release device in any emergency situations, and therefore, can prevent the vehicle driver from being placed in any dangerous situation. Also, the parking brake of the present invention can be released from any place where a cable is connected, such as a driver's seat, etc., resulting in maximized convenience in operation.

Although the embodiment of the present invention has been shown and described, it would be appreciated by those skilled in the art that changes may be made in this embodiment without departing from the principles and spirit of the invention, the scope of which is defined in the claims and their equivalents.

What is claimed is:

1. An electric parking brake comprising:
    a housing defining an outer appearance of the parking brake;
    an actuator mounted at one side of the housing to perform forward and reverse rotations;
    a gear box assembly having gears to reduce a rotating force generated from the actuator;
    a driven gear provided in the gear box assembly to transmit the reduced rotating force;
    a spindle having screw threads engaged with the driven gear;
    a screw nut having a coupling hole to be screwed to the spindle;

an equalizer through which the spindle is penetrated and the screw nut is rotatably inserted;

brake cables connected to opposite sides of the equalizer, respectively, each brake cable having a first end formed with a coupling piece for the connection of the equalizer and a second end connected to an associated one of wheel brake devices; and an emergency release device comprising at least one cam unit and at least one operating lever, the emergency release device being adapted to slacken the brake cables in an emergency release situation, so as to release the parking brake;

wherein the emergency release device further comprises protrusions integrally extended from a casing of a force sensor;

wherein the at least one cam unit comprises a plurality of cam units adapted to be normally caught by the protrusions, respectively, so as to support the force sensor at a fixed position and to be rotated in an emergency release situation so as to be released from the protrusions; and wherein the at least one operating lever comprises a plurality of operating levers, each operating lever having one end coupled to an associated one of the cam units by use of a shaft fitted in a hole of the associated cam unit and adapted to rotate the associated cam unit in an emergency release situation.

2. The brake according to claim 1, further comprising:

the force sensor provided at one side of the gear box assembly to allow the spindle to be penetrated therethrough, the force sensor being used to measure a force to be applied to the electric parking brake, wherein the force sensor comprises:

the casing defining an outer appearance thereof;

an elastic member wound on the spindle, to which a rotating force of the spindle is transmitted; and a plate member to convert the rotating force transmitted to the elastic member into a linear displacement of the elastic member.

3. The brake according to claim 1, wherein:

each operating lever has an operating slot formed at the other end thereof not connected to the associated cam unit; and an operating shaft is fitted in the operating slot to allow the operating levers of a pair to be moved in the same direction as each other even if one of the operating levers is moved.

4. The brake according to claim 3, wherein a cable is connected to the operating slot of each operating lever, to allow the electric parking brake to be released manually if the cable is pulled.

* * * * *